(12) United States Patent
Goodson et al.

(10) Patent No.: US 9,707,550 B2
(45) Date of Patent: Jul. 18, 2017

(54) HETEROGENEOUS CATALYSTS FOR NMR/MRI ENHANCEMENT VIA SIGNAL AMPLIFICATION BY REVERSIBLE EXCHANGE (SABRE)

(71) Applicants: Vanderbilt University, Nashville, TN (US); Board of Trustees of Southern Illinois University, Carbondale, IL (US)

(72) Inventors: Boyd M. Goodson, Carbondale, IL (US); Eduard Y. Chekmenev, Brentwood, TN (US); Fan Shi, Energy, IL (US); Aaron M. Coffey, Nashville, TN (US)

(73) Assignees: Vanderbilt University, Nashville, TN (US); Board of Trustees of Southern Illinois Univeristy, Carbondale, IL (US)

( * ) Notice: Subject to any disclaimer, the term of this patent is extended or adjusted under 35 U.S.C. 154(b) by 0 days.

(21) Appl. No.: 14/801,541

(22) Filed: Jul. 16, 2015

(65) Prior Publication Data
US 2016/0016159 A1    Jan. 21, 2016

Related U.S. Application Data

(60) Provisional application No. 62/025,743, filed on Jul. 17, 2014.

(51) Int. Cl.
*B01J 31/22*    (2006.01)
*B01J 31/16*    (2006.01)

(52) U.S. Cl.
CPC ....... *B01J 31/2295* (2013.01); *B01J 31/1616* (2013.01); *B01J 31/1658* (2013.01); *B01J 31/2273* (2013.01); *B01J 2531/827* (2013.01)

(58) Field of Classification Search
CPC .............. B01J 31/2295; B01J 2531/827; B01J 31/1658; B01J 31/1616
See application file for complete search history.

(56) References Cited

PUBLICATIONS

Blanco et al. "Enhanced Hydrogen Transfer Catalytic Activity of Iridium N-Heterocyclic Carbenes by Covalent Attachment on Carbon Nanotubes" ACS Catal. 2013, 3, 1307-1317.*

Fekete, M. et al., "Utilisation of water soluble iridium catalysts for signal amplification by reversible exchange," Dalton Trans., 2015, vol. 44, pp. 7870-7880.

He P, Best QA, Groome KA, Coffey AM, Truong ML, Waddell KW, Chekmenev EY, Goodson BM. 55th Exptl Nucl Magn Reson Conf. Boston, MA: Mar. 23-28, 2014. "A Water-Soluble SABRE Catalyst for NMR/MRI Enhancement," Abstract for Poster 041 (1 page).

(Continued)

*Primary Examiner* — Mark Kaucher
(74) *Attorney, Agent, or Firm* — Michael Best & Friedrich LLP

(57) ABSTRACT

Heterogeneous iridium catalysts for nuclear spin polarization enhancement in solution via signal amplification by reversible exchange are provided. Also provided are methods for preparing heterogeneous iridium catalysts, and methods of using heterogeneous iridium catalysts for nuclear spin polarization enhancement in solution via signal amplification by reversible exchange.

18 Claims, 7 Drawing Sheets

(56) References Cited

PUBLICATIONS

He P, Best QA, Groome KA, Coffey AM, Truong ML, Waddell KW, Chekmenev EY, Goodson BM. 55th Exptl Nucl Magn Reson Conf. Boston, MA: Mar. 23-28, 2014. "A Water-Soluble SABRE Catalyst for NMR/MRI Enhancement," Poster 041 (1 page).

Shchepin, R.V. et al., "Hyperpolarization of "Neat" Liquids by NMR Signal Amplification by Reversible Exchange," The Journal of Physical Chemistry Letters, 2015, vol. 6, pp. 1961-1967.

Shchepin, R.V. et al., "Supporting Information for Hyperpolarization of "Neat" Liquids by NMR Signal Amplification by Reversible Exchange," Journal of Physical Chemistry Letters, 2015, vol. 6, pp. 1961-1967 SI (12 pages).

Hövener, J. et al., "Toward Biocompatible Nuclear Hyperpolarization Using Signal Amplification by Reversible Exchange: Quantitative in Situ Spectroscopy and High-Field Imaging," Anal. Chem. 2014, 86, 1767-1774.

Shi, F. et al., "Developments in NMR Signal Enhancement by Reversible Exchange (SABRE): Nanoscale Catalysts for HET-SABRE and a Water-Soluble Ir Ir Catalyst Aqueous SABRE in a Single Step," ENC in The 56th ENC Experimental Nuclear Magnetic Resonance Conference, Apr. 19-24, 2015, Poster 260 (1 page).

Shi, F. et al., 55th Exptl Nucl Magn Reson Conf. Boston, MA: Mar. 23-28, 2014. "Enhancement of Solution NMR Signals using Heterogeneous SABRE Catalysts," ENC 2014, Abstract for Poster 029 (1 page).

Shi, F. et al., "Enhancement of Solution NMR Signals using parahydrogen and a heterogeneous SABRE catalyst," 2013 Midwest Regional Meeting of the ACS, Springfield, MO, Oct. 16-19, 2013 (2 pages).

Shi, F. et al., "Nanoscale Catalysts for NMR Signal Enhancement by Reversible Exchange," J. Phys. Chem. C 2015, 119, 7525-7533.

Shi, F. et al., "Nanoscale Catalysts for NMR Signal Enhancement by Reversible Exchange," J. Phys. Chem. C 2015, 119, 7525-7533, Supporting Information (13 pages).

The 55th ENC Experimental Nuclear Magnetic Resonance Conference, Boston, MA, Mar. 23-28, 2014 (147 pages).

Truong, M.L. et al., 55th Exptl Nucl Magn Reson Cont Boston, MA: Mar. 23-28, 2014. "High-Field Signal Amplification by Reversible Exchange (SABRE): Activation and Mechanism of NHC-Ir Catalyst," Abstract for Poster 037 (1 page).

Truong, M.L. et al., 55th Exptl Nucl Magn Reson Conf Boston, MA: Mar. 23-28, 2014. "High-Field Signal Amplification by Reversible Exchange (SABRE): Activation and Mechanism of NHC-Ir Catalyst," Poster 037 (1 page).

Shi, F. et al., "Developments in NMR Signal Enhancement by Reversible Exchange (SABRE): Nanoscale Catalysts for HET-SABRE and a Water-Soluble Ir Catalyst for Aqueous SABRE in a Single Step," ENC in The 56th ENC Experimental Nuclear Magnetic Resonance Conference, Apr. 19-24, 2015, Abstract for Poster 260 (2 pages).

Shi, F. et al., Heterogeneous Solution NMR Signal Amplification by Reversible Exchange, Angewandte Chemie International Edition, 2014, 53, 7495-7498.

Truong, M. et al., "Irreversible Catalyst Activation Enables Hyperpolarization and Water Solubility for NMR Signal Amplification by Reversible Exchange," J. Phys. Chem. B 2014, 118, 13882-13889.

Vazques-Serrano et al., "Inorganic Chimica Acta," (2006) 359, 2786-2797.

Office Action from the US Patent and Trademark Office for U.S. Appl. No. 14/801,554 dated Jun. 29, 2016 (8 pages).

\* cited by examiner

HETEROGENEOUS CATALYSTS FOR NMR/MRI ENHANCEMENT VIA SIGNAL AMPLIFICATION BY REVERSIBLE EXCHANGE (SABRE)

CROSS REFERENCE TO RELATED APPLICATIONS

This application claims priority to U.S. Provisional Application No. 62/025,743, filed Jul. 17, 2014, which is herein incorporated by reference in its entirety.

STATEMENT OF GOVERNMENT INTEREST

This invention was made with government support under Award No. W81XWH-12-1-0159/BC112431 awarded by the Department of Defense; Grant No. 3R00CA134749-03 awarded by the National Institutes of Health; Grant No. 1R21EB018014-01A1 awarded by the National Institutes of Health; Grant No. CHE-1416268 awarded by the National Science Foundation; and Grant No. CHE-1416432 awarded by the National Science Foundation. The Government has certain rights in the invention.

TECHNICAL FIELD

The present disclosure relates to heterogeneous catalysts, and more particularly, to preparation and use of heterogeneous iridium catalysts for nuclear spin polarization enhancement in solution via signal amplification by reversible exchange (SABRE) technique using parahydrogen as a source of nuclear spin hyperpolarization.

BACKGROUND

Magnetic resonance imaging (MRI) of metabolic markers offers a powerful method to screen and diagnose diseases as well as to gauge response to treatment. Yet at Boltzmann equilibrium, spin polarizations of conventional MR (on the order of $\sim 10^{-5}$-$10^{-6}$) are too low, and the metabolites are often too dilute, to detect, quantify, or image such substances in vivo on a reasonable time-scale. However, spin order attained by 'hyperpolarizing' substances beyond Boltzmann levels can be high enough to overcome such otherwise-poor detection sensitivity. Because the high nuclear spin polarization is independent of magnetic field, strong magnetic fields are unnecessary for some applications, permitting low/zero-field MRS/MRI, and even remotely-detected MRS/MRI.

Known hyperpolarization techniques include dynamic nuclear polarization (DNP) and Optical Pumping; however, another route to address the NMR/MRI sensitivity problem is to use parahydrogen ($pH_2$) as the hyperpolarization source, as is done in a family of techniques referred to collectively as Parahydrogen-Induced Polarization (PHIP). In traditional PHIP, molecular precursors with unsaturated chemical bonds are hydrogenated via molecular addition of $pH_2$, thereby transferring the nuclear spin order to the molecular products. In a more recent variant, referred to as Signal Amplification by Reversible Exchange (SABRE), spin order may be transferred from $pH_2$ to target molecules during the lifetime of transient molecular complexes without permanent chemical change.

Catalysis plays a role in both PHIP approaches, as they each generally require an organometallic catalyst to facilitate the underlying chemical reactions; this typically takes place under conditions of homogeneous catalysis—a process wherein the catalyst molecules are dissolved within the same phase as the reagents. Thus, the wider biological application of PHIP for production of highly polarized liquids is constrained by the difficulty of separating the potentially toxic and expensive catalyst substances from the created hyperpolarized (HP) agents. Furthermore, the chemistry of both liquid phase SABRE and aqueous PHIP first requires catalyst activation, often resulting in the release of chelating substances (e.g. octadiene, norbornadiene, or derivatives) into the liquid phase. Thus, there exists a need for new catalysts and methods in order to broaden the applicability of SABRE.

SUMMARY

In one aspect, disclosed is a compound of formula (I),

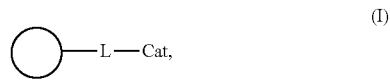

(I)

wherein,

is a solid support;
L is a bond or a linker; and
Cat has formula:

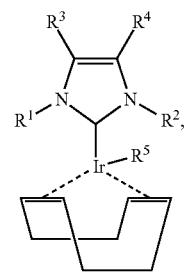

(II)

wherein $R^1$ and $R^2$ are each independently selected from aryl, heteroaryl, arylalkyl, heteroarylalkyl, wherein said aryl, heteroaryl, arylalkyl, and heteroarylalkyl are each independently unsubstituted or substituted with one or more suitable substituents; $R^3$ and $R^4$ are each independently selected from hydrogen and alkyl; $R^5$ is halogen or pyridinyl, wherein said pyridinyl is unsubstituted or substituted with one or more suitable substituents; provided that one of $R^1$, $R^2$, $R^3$, $R^4$, and $R^5$ links to the solid support via L.

DETAILED DESCRIPTION

Figure 1:
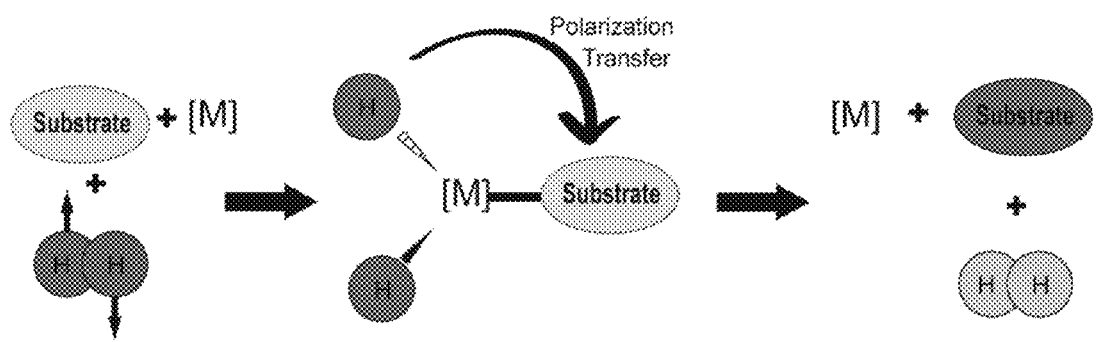
FIG. 1 depicts low-field SABRE-based polarization transfer. $p$-$H_2$ is exploited to polarize the substrate's nuclear spins via the reversible formation of a complex organized around a metal catalyst. In low field, net spin order can be transferred from the $p$-$H_2$ to the spins of substrates via scalar couplings. High-field SABRE can be achieved as disclosed herein, but may work via a different mechanism.

Disclosed herein are heterogeneous iridium catalysts. The catalysts can be used for nuclear spin polarization enhancement in solution via signal amplification by reversible exchange (SABRE). Also disclosed are methods for preparing the heterogeneous iridium catalysts, and methods of using the iridium catalysts for nuclear spin polarization enhancement in solution via signal amplification by reversible exchange.

The disclosed catalysts, synthetic methods, and methods of use provide several advantages. As one advantage, the disclosed catalysts can provide for methods of removing a hyperpolarized substrate from the apparatus without contamination from the catalyst. The substrate with enhanced magnetization can be stored for a sufficient time to perform a desired NMR experiment. As another advantage, the disclosed catalysts can be easily recovered, recycled, and used for polarization of multiple batches of substrate(s). As another advantage, the disclosed catalysts avoid the issue of unwanted release of chelates into solution by pre-activating the catalyst particles before use. As another advantage, the disclosed catalysts can provide for relatively low-cost, rapid, and high-throughput production of hyperpolarized substances, opening the door to the straightforward preparation of chemically pure hyperpolarized agents for a wide range of biological, in vivo, and ultimately spectroscopic and imaging studies.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

As used herein, the term "suitable substituent" is intended to mean a chemically acceptable functional group (e.g., a moiety that does not negate the activity of the inventive compounds). A suitable substituent group may refer to a water-soluble or hydrophilic functional group. Illustrative examples of suitable substituents include, but are not limited to halo groups, perfluoroalkyl groups, perfluoroalkoxy groups, alkyl groups, alkenyl groups, alkynyl groups, hydroxy groups, halo groups, oxo groups, mercapto groups, alkylthio groups, alkoxy groups, nitro groups, azidealkyl groups, aryl or heteroaryl groups, aryloxy or heteroaryloxy groups, aralkyl or heteroaralkyl groups, aralkoxy or heteroaralkoxy groups, HO—(C═O)— groups, heterocylic groups, cycloalkyl groups, amino groups, alkyl—and dialkylamino groups, carbamoyl groups, alkylcarbonyl groups, alkylcarbonyloxy groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups and the like. The substituents can be substituted by additional substituents.

The term "alkyl," as used herein, refers to a saturated hydrocarbon chain having 1 to 12 carbon atoms. Suitable examples include alkyls having 1 to 7 carbon atoms, 1 to 6 carbon atoms, 1 to 5 carbon atoms, 1 to 4 carbon atoms or 1 to 3 carbon atoms. Alkyl groups may be straight or branched, and branched alkyl groups may have one or more branches. Alkyl groups may be unsubstituted or may have one or more independent substituents. Unless otherwise specified, each substituent may include, but is not limited to an alkyl, a cycloalkyl, a bicycloalkyl, an alkenyl, a cycloalkenyl, a bicycloalkenyl, an alkynyl, an acyl, an aryl, a cyano group, a halogen, a hydroxyl group, a carboxyl group, an isothiocyanoto group, an ether, an ester, a ketone, a sulfoxide, a sulfone, a thioether, a thioester, a thiol group, an amino, an amido, or a nitro group, among others. Each substituent also may include any group that, in conjunction with the alkyl, forms an ether, an ester, a ketone, a thioether, a thioester, a sulfoxide, a sulfone, an amine or an amide, among others. Some alkyl groups may have one or more chiral carbons because of the branching or substitution. Chiral alkyl groups may include both (+)dextrorotary and (−)levorotary compounds; "D-" and "L-" chiral compounds, as well as alkyl groups containing "R-" and "S-" stereocenters. Some alkyl groups may include one or more heteroatoms.

The term "aryl," as used herein, means monocyclic, bicyclic, or tricyclic aromatic radicals. Representative examples of the aryl groups include, but are not limited to, phenyl, dihydroindenyl, indenyl, naphthyl, dihydronaphthalenyl, and tetrahydronaphthalenyl. Aryl groups may be optionally substituted by one or more suitable substituents, preferably 1 to 5 suitable substituents, as defined above.

The term "arylalkyl," as used herein, refers to an aryl group, as defined herein, appended to the parent molecular moiety through an alkyl group, as defined herein. Representative examples of arylalkyl include, but are not limited to, phenylmethyl and phenylethyl.

The term "carboxyl," as used herein, refers to the group —COOR, where R is a carboxyl substituent. Unless otherwise specified, carboxyl substituents may include, but are not limited to an alkyl, an alkenyl, an alkynyl, a cycloalkyl, a cycloalkynyl, and an aryl, among others.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

The term "heteroaryl," as used herein, refers to a monocyclic heteroaryl or a bicyclic heteroaryl. The monocyclic heteroaryl is a five- or six-membered ring. The five-membered ring contains two double bonds. The five-membered ring may contain one heteroatom selected from O or S; or one, two, three, or four nitrogen atoms and optionally one oxygen or sulfur atom. The six-membered ring contains three double bonds and one, two, three or four nitrogen atoms. Representative examples of monocyclic heteroaryl include, but are not limited to, furanyl, imidazolyl, isoxazolyl, isothiazolyl, oxadiazolyl, 1,3-oxazolyl, pyridinyl, pyridazinyl, pyrimidinyl, pyrazinyl, pyrazolyl, pyrrolyl, tetrazolyl, thiadiazolyl, 1,3-thiazolyl, thienyl, triazolyl, and triazinyl. The bicyclic heteroaryl includes a monocyclic heteroaryl fused to a phenyl, or a monocyclic heteroaryl fused to a monocyclic cycloalkyl, or a monocyclic heteroaryl fused to a monocyclic cycloalkenyl, or a monocyclic heteroaryl fused to a monocyclic heteroaryl, or a monocyclic heteroaryl fused to a monocyclic heterocycle. Representative examples of bicyclic heteroaryl groups include, but are not limited to, benzofuranyl, benzothienyl, benzoxazolyl, benzimidazolyl, benzoxadiazolyl, 6,7-dihydro-1,3-benzothiazolyl, imidazo[1,2-a]pyridinyl, indazolyl, indolyl, isoindolyl, isoquinolinyl, naphthyridinyl, pyridoimidazolyl, quinazolinyl, quinolinyl, thiazolo[5,4-b]pyridin-2-yl, thiazolo[5,4-d]pyrimidin-2-yl, and 5,6,7,8-tetrahydroquinolin-5-yl. Heteroaryl groups may be unsubstituted or substituted by one or more suitable substituents, preferably 1 to 5 suitable substituents, as defined above.

The term "heteroarylalkyl," as used herein, refers to a heteroaryl group, as defined herein, appended to the parent molecular moiety through an alkyl group, as defined herein.

The term "heterocycle" or "heterocyclyl," as used herein, refers to a monocyclic heterocycle, a bicyclic heterocycle, or a tricyclic heterocycle. The monocyclic heterocycle is a three-, four-, five-, six-, seven-, or eight-membered ring containing at least one heteroatom independently selected from the group consisting of oxygen, nitrogen, phosphorus and sulfur. The three- or four-membered ring contains zero or one double bond, and one heteroatom selected from the group consisting of oxygen, nitrogen, phosphorus and sulfur. The five-membered ring contains zero or one double bond and one, two or three heteroatoms selected from the group consisting of oxygen, nitrogen, phosphorus and sulfur. The six-membered ring contains zero, one or two double bonds and one, two, or three heteroatoms selected from the group consisting of oxygen, nitrogen, phosphorus and sulfur. The seven- and eight-membered rings contains zero, one, two, or three double bonds and one, two, or three heteroatoms selected from the group consisting of oxygen, nitrogen, phosphorus and sulfur. Representative examples of monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, phosphinane, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydropyrimidinyl, tetrahydrothienyl, thiadiazolinyl, thiadiazolidinyl, thiazolinyl, thiazolidinyl, thiomorpholinyl, 1,1-dioxidothiomorpholinyl(thiomorpholine sulfone), thiopyranyl, trithianyl, and 2,5-dioxo-pyrrolidinyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, or a monocyclic heterocycle fused to a monocyclic heterocycle, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. Representative examples of bicyclic heterocycles include, but are not limited to, benzopyranyl, benzothiopyranyl, chromanyl, 2,3-dihydrobenzofuranyl, 2,3-dihydrobenzothienyl, azabicyclo[2.2.1]heptyl (including 2-azabicyclo[2.2.1]hept-2-yl), 2,3-dihydro-1H-indolyl, isoindolinyl, octahydrocyclopenta[c]pyrrolyl, octahydropyrrolopyridinyl, 9-phosphabicyclo[3.3.1]nonane, 8-phosphabicyclo[3.2.1]octane, and tetrahydroisoquinolinyl. Tricyclic heterocycles are exemplified by a bicyclic heterocycle fused to a phenyl group, or a bicyclic heterocycle fused to a monocyclic cycloalkyl, or a bicyclic heterocycle fused to a monocyclic cycloalkenyl, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but are not limited to, octahydro-2,5-epoxypentalene, hexahydro-2H-2,5-methanocyclopenta[b]furan, hexahydro-1H-1,4-methanocyclopenta[c]furan, aza-admantane (1-azatricyclo[3.3.1.1$^{3,7}$]decane), oxa-adamantane (2-oxatricyclo[3.3.1.1$^{3,7}$]decane), and 2,4,6-trioxa-8-phosphatricyclo[3.3.1.13,7]decane. Heterocyclic groups may be unsubstituted or substituted by one or more suitable substituents, preferably 1 to 3 suitable substituents, as defined above. Heterocyclic groups can contain one or more oxo groups (=O) or thioxo (=S) groups attached to the ring.

The term "hydroxyl," as used herein, refers to the group —OH.

The term "isotopically enriched," as used herein with reference to any particular isotope of any particular atom of a compound, means that in a composition comprising a plurality of molecules of the compound, the amount (e.g., fraction, ration or percentage) of the plurality of molecules having the particular isotope at the particular atom is substantially greater than the natural abundance of the particular isotope, due to synthetic enrichment of the particular atom with the particular isotope. For example, a composition comprising a compound with an isotopically enriched $^{15}$N atom at a particular location includes a plurality of molecules of the compound where, as a result of synthetic enrichment, the percentage of the plurality of molecules having $^{15}$N at that location is greater than about 1% (the natural abundance of $^{15}$N is substantially less than 1%), and in many cases is substantially greater than about 1%. Similarly, a composition comprising a compound with an isotopically enriched deuterium (D) atom at one or more particular locations includes a plurality of molecules of the compound, where as a result of synthetic enrichment, the percentage of the plurality of molecules having D at each of the one or more particular locations is greater than about 1% (the natural abundance of D is substantially less than 1%), and in many cases is substantially greater than about 1%. In some cases, a composition comprising a compound with an isotopically enriched atom at a particular location may include a plurality of molecules of the compound, where the amount of the plurality of molecules having the isotope at the location may be at least about two-or-more-fold greater than the natural abundance of the isotope, including but not limited to at least about two-fold, at least about three-fold, at least about four-fold, at least about five-fold, at least about 10-fold, at least about 20-fold, at least about 30-fold, at least about 40-fold, at least about 50-fold, at least about 60-fold, at least about 70-fold, at least about 80-fold, at least about 90-fold, at least about 100-fold, and at least about 200-fold, among others. In some cases, a composition comprising a compound with an isotopically enriched atom at a particular location also may include a plurality of molecules of the compound where, as a result of synthetic enrichment, at least about 1%, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%, of the plurality of molecules have the isotope at the location.

The term "leaving group," as used herein, refers to any molecular moiety that departs with a pair of electrons in hydrolytic bond cleavage. A leaving group may include, but is not limited to, a halogen (e.g., fluorine, chlorine, bromine, or iodine), a tosyl group (e.g., p-toluenesulfonyl), a methanesulfonyl group (e.g., CH$_3$SO$_2$—), a trifluoromethanesolfonyl group (e.g., CF$_3$SO$_2$—), and a trifluoroacetate group (e.g., CF$_3$CO$_2$—), among others.

The term "linker" may refer to a chain of atoms (e.g., 1 to 50 atoms) that link a solid support to a catalyst. A linker may include one or more heteroatoms. A linker may be substituted (e.g., by oxo groups, amino groups, alkyl groups, halogens or nitro groups). A linker may include acylic groups (e.g., linear or branched alkyl), cyclic groups (e.g., aryl, heteroaryl, cycloalkyl, heterocyclic), or a combination thereof The term "natural abundance," as used herein with reference to any particular isotope of an element, refers to the abundance of the isotope as naturally found on the planet Earth. For example, the natural abundance of $^{15}$N on the planet Earth is generally regarded to be about 0.37% (i.e., substantially less than about 1%), while the natural abundance of deuterium (D) on the planet Earth is generally regarded to be about 0.015% (i.e., substantially less than about 1%).

The term "saturated," as used herein, means that a moiety has no units of unsaturation.

The term "unsaturated," as used herein, means that a moiety has one or more carbon-carbon double or triple bonds.

2. Heterogeneous Iridium Catalysts

In one aspect, disclosed are heterogeneous iridium catalysts useful for nuclear spin polarization enhancement in solution via signal amplification by reversible exchange. The heterogeneous catalysts can have formula (I):

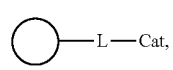

(I)

wherein,

is a solid support;
L is a bond or a linker; and
Cat has formula:

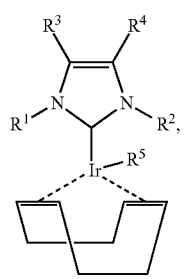

(II)

wherein R$^1$ and R$^2$ are each independently selected from aryl, heteroaryl, arylalkyl, heteroarylalkyl, wherein said aryl, heteroaryl, arylalkyl, and heteroarylalkyl are each independently unsubstituted or substituted with one or more suitable substituents; R$^3$ and R$^4$ are each independently selected from hydrogen and alkyl; R$^5$ is halogen or pyridinyl, wherein said pyridinyl is unsubstituted or substituted with one or more suitable substituents; provided that one R$^1$, R$^2$, R$^3$, R$^4$, and R$^5$ links to the solid support via L.

In certain embodiments, the iridium in the catalyst of formula (II) is in the +1 oxidation state. For example, in certain embodiments, the iridium is in the +1 oxidation state, the R$^5$ ligand is a neutral ligand, and a non-coordinating anion (e.g., hexafluorophosphate [PF$_6$]$^-$, tetrafluoroborate [BF$_4$]$^-$, or perchlorate [ClO$_4$]$^-$) accompanies the catalyst of formula (II), which may or may not be depicted.

In certain embodiments, the solid support is a nanoparticle. In certain embodiments, the solid support is a titanium dioxide nanoparticle. In certain embodiments, the solid support is silica. In certain embodiments, the solid support is a polymer microbead. In certain embodiments, the solid support is polystyrene. In certain embodiments, the support is a polystyrene microbead.

In certain embodiments, L is a bond. In certain embodiments, L is a linker, wherein the linker is derived from an amino acid (e.g., alanine) In certain embodiments, L is a linker, wherein the linker is derived from 4-dimethylaminopyridine.

In certain embodiments, R$^1$ is aryl. In certain embodiments, R$^1$ is mesityl.

In certain embodiments, R$^2$ is aryl. In certain embodiments, R$^2$ is mesityl.

In certain embodiments, R$^3$ and R$^4$ are each hydrogen.

In certain embodiments, R$^5$ is chloro. In certain embodiments, R$^5$ is an unsubstituted or substituted pyridinyl.

In certain embodiments, the heterogeneous catalyst can have formula (I-a),

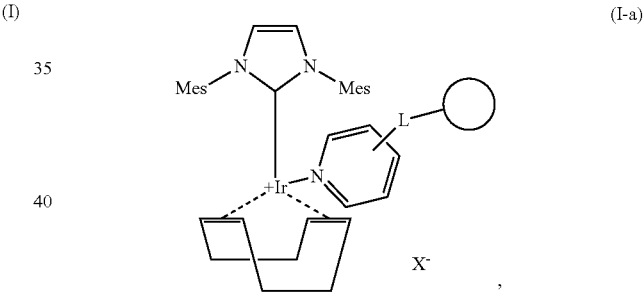

(I-a)

wherein Mes is mesityl; X$^-$ is a non-coordinating anion; and L and the solid support are as defined above.

In certain embodiments, the heterogeneous catalyst can have formula (I-b),

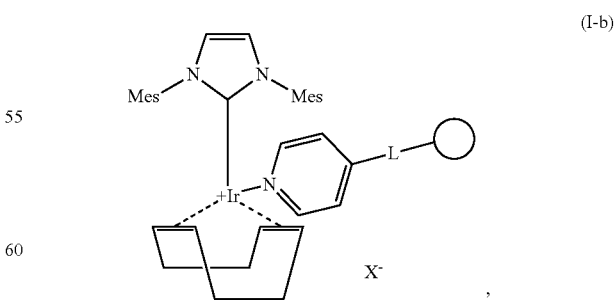

(I-b)

wherein Mes is mesityl; X$^-$ is a non-coordinating anion; and L and the solid support are as defined above.

In certain embodiments, the heterogeneous catalyst can have formula (I-c),

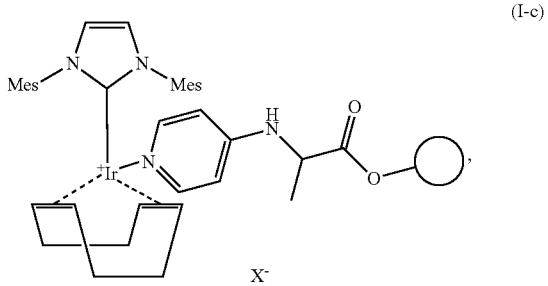
(I-c)

wherein Mes is mesityl; X⁻ is a non-coordinating anion; and the solid support is as defined above. In certain embodiments, the solid support is a titanium dioxide nanoparticle.

In certain embodiments, the heterogeneous catalyst can have formula (I-d),

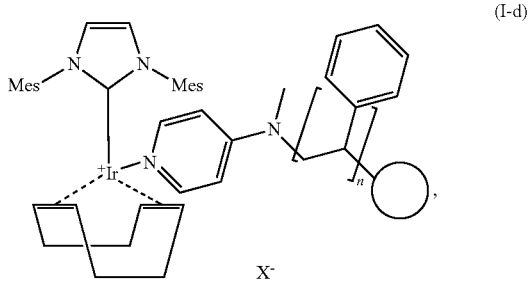
(I-d)

wherein Mes is mesityl; X⁻ is a non-coordinating anion; and the solid support is polystyrene.

In certain embodiments, the heterogeneous catalyst can have formula (I-e),

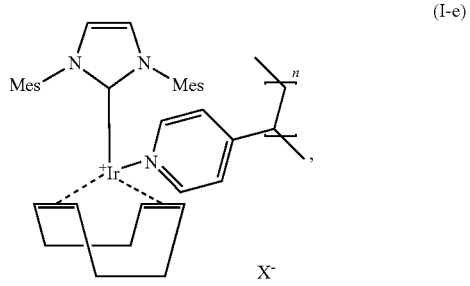
(I-e)

wherein Mes is mesityl; and X⁻ is a non-coordinating anion.

In certain embodiments, the heterogeneous catalyst can have formula (I-f),

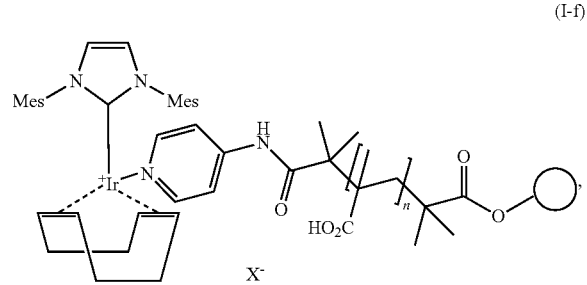
(I-f)

wherein Mes is mesityl; X⁻ is a non-coordinating anion; and the solid support is a titanium dioxide nanoparticle.

3. Synthesis Of Catalysts

The disclosed heterogeneous catalysts can be better understood in connection with the following synthetic schemes, which illustrate methods by which the compounds can be prepared. The heterogeneous catalysts can be used for hyperpolarized magnetic resonance.

A. Synthesis and Immobilization of Sabre Catalyst Moieties onto TiO₂ Core-shell Nanoparticles Scheme 1 shows synthesis of an N-heterocyclic carbene complex-based Ir catalyst. The Ir dimer (1) was reacted with the N-heterocyclic carbene derivative (2) in benzene and an inert atmosphere. After vacuum-drying and recrystallization in pentane, [IrCl(COD)(IMes)] (3) was obtained (IMes=1, 3-bis(2,4,6-trimethyl-phenyl)imidazol-2-ylidene; COD=cyclooctadiene).

Scheme 1

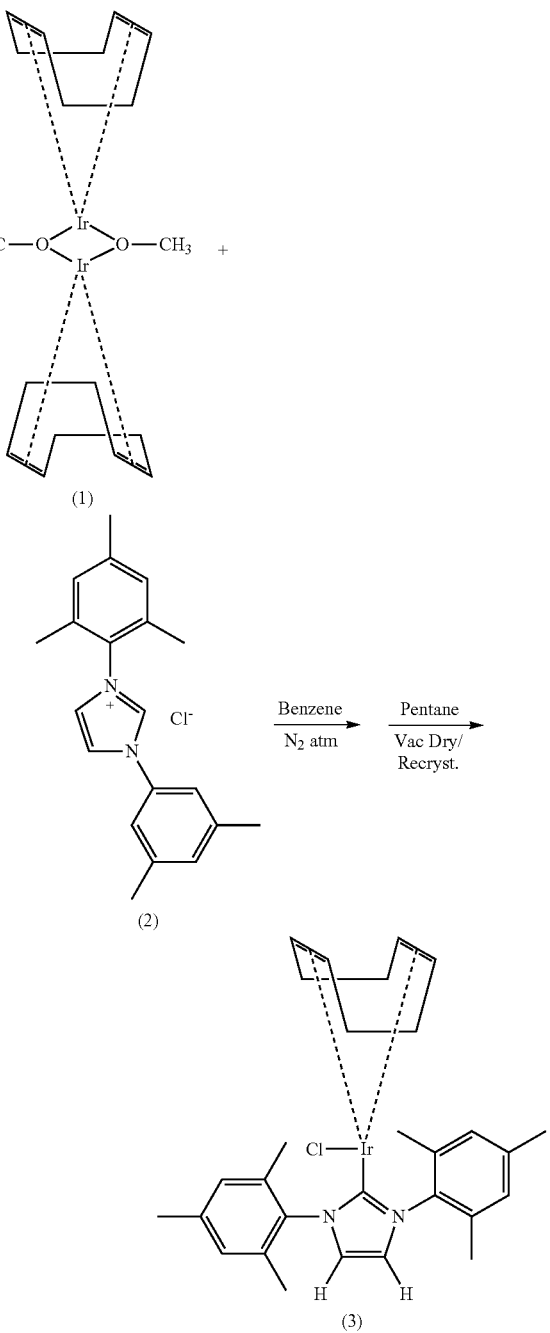

In an exemplary procedure, 0.38 g IMS (1,3-Bis(2,4,6-trimethylphenyl)-1,3-dihydro-2H-imidazol-2-ylidene;

Aldrich) and 0.403 g [{Ir(μ-Cl)(cod)}2] (Aldrich) were added in a small Schlenk tube (Kontes). Then 10 ml dried and deoxygenated benzene was transferred into the vial with a syringe. After 2 hours of stirring, the Schlenk tube was evacuated in order to concentrate the compound via solvent removal until only ~20% of the solution volume remained. 5 ml dried and deoxygenated pentane was added into the Schlenk tube. The supernatant from the Schlenk tube was transferred into a small beaker. This process was repeated twice. Yellow flake crystals were left on the bottom of the Schlenk tube. The Schlenk tube was left to evacuate for 12 hours. To make it purer, the synthesized chemical was recrystallized.

Once synthesized, successful creation of the homogeneous SABRE catalyst was confirmed via $^1$H and $^{13}$C NMR. Deuterated solvents were purchased from Cambridge Isotope Laboratories. The chemical shifts were (referenced to TMS): $^1$H NMR (400 MHz, $C_6D_6$, 294 K) δ (ppm)=6.78 (s, 2H, Mes); 6.81 (s, 2H, Mes); 6.15 (s, 2H, =CHN); 4.70 (m, 2H, cod); 3.19 (m, 2H, cod); 2.59 (s, 6H, $CH_3$); 2.15 (s, 6H, $CH_3$); 2.05 (s, 6H, $CH_3$); 1.80 (m, 4H, cod); 1.35 (m, 4H, cod); $^{13}$C NMR (100.56 MHz, $C_6D_6$, 294 K) δ (ppm)= 182.11 ($CN_2$); 138.65; 137.96; 136.77; 134.40; 130.13 (Mes); 123.12 (=CHN—); 83.38; 50.77 (—CH—, cod); 34.07; 29.3 (—$CH_2$—, cod); 21.0; 20.13; 18.24 (—$CH_3$, Mes).

Scheme 2 shows that (3) was first reacted with $AgPF_6$ in THF and an inert atmosphere, wherein precipitation of AgCl drives the removal of the Cl moiety from (3) and the weak association of the $PF_6^-$ ion. Filtration of the solution and addition of commercial polymer microbeads functionalized with 4-dimethylamino-pyridine resulted in the creation of the final 'HET-SABRE' catalyst (4). This approach was designed to exploit the fact that one of the pyridine-accepting positions on the catalyst's Ir center is not labile.

Scheme 2

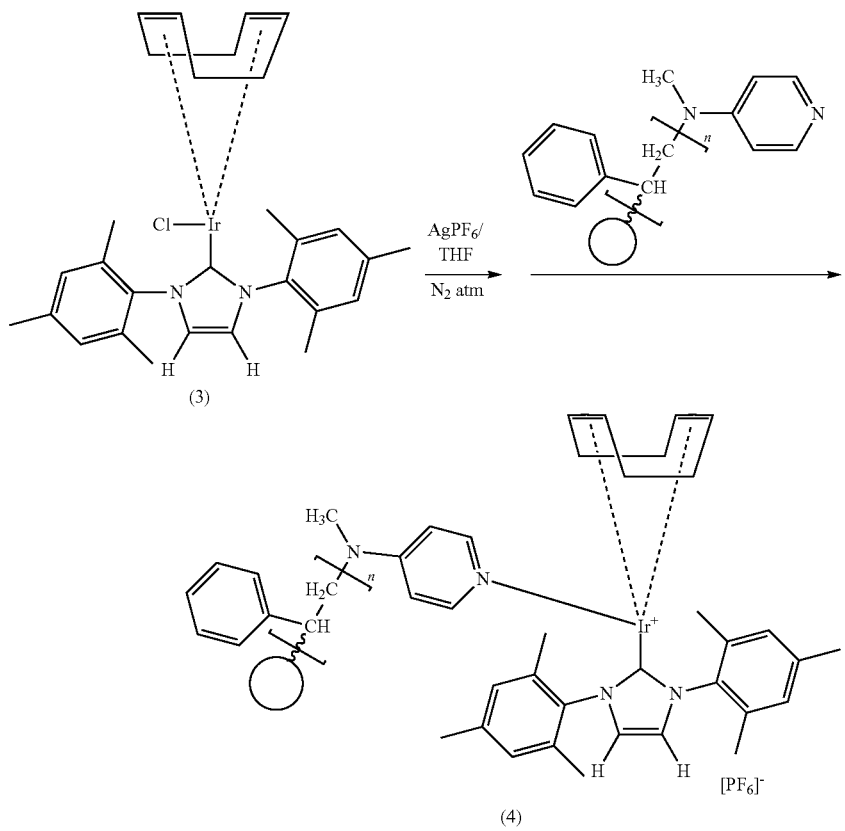

In an exemplary procedure, the homogeneous SABRE catalyst (synthesized as described above) was used as a starting material for the preparation of the HET-SABRE catalyst material. 0.1 g of the homogeneous SABRE catalyst, 41.7 mg of $AgPF_6$ (Aldrich), and ~5.6 g of polymer-bound 4-dimethylaminopyridine (200-400 mesh, extent of labeling: ~6.0 mmol/g loading, 2% cross-linked) were transferred into a glove box with a nitrogen atmosphere. The yellow SABRE catalyst was dissolved in THF (about 4 ml). $AgPF_6$ was dissolved in the SABRE catalyst solution. It was observed that the solution became opaque. Aluminum foil paper was wrapped around the reaction vial to reduce light exposure. After stirring for 2 hours, the AgCl precipitate was filtered out to give a red solution. Next, 5.6 g of polymer was transferred into the 40 ml vial with ~15 ml THF. The previously prepared red solution, containing $PF_6^-$-replaced SABRE catalyst, was added into the 40 mL vial. It was stirred in the dark for 12 hours. The color of supernatant turned to be much lighter. This whole cycle was repeated 3 times to maximize the amount of SABRE catalyst attached onto the surface of the polymer base. The polymer was evacuated for 24 hours.

Successful immobilization of the Ir-complex onto the polymer microbeads was supported by AAS, IR, and MS experiments; according to AAS, the Ir-complex comprises about 4% of the total HET-SABRE catalyst particles by weight. The first indication of a change consistent with successful immobilization of the catalyst on the polymer supports was a slight color change in the material: Once the pyridine groups at the terminal positions of the polymer supports become tethered to the catalyst moieties (via binding to the Ir centers), the color of the polymer support material took on a slightly brownish hue.

Figure 2:
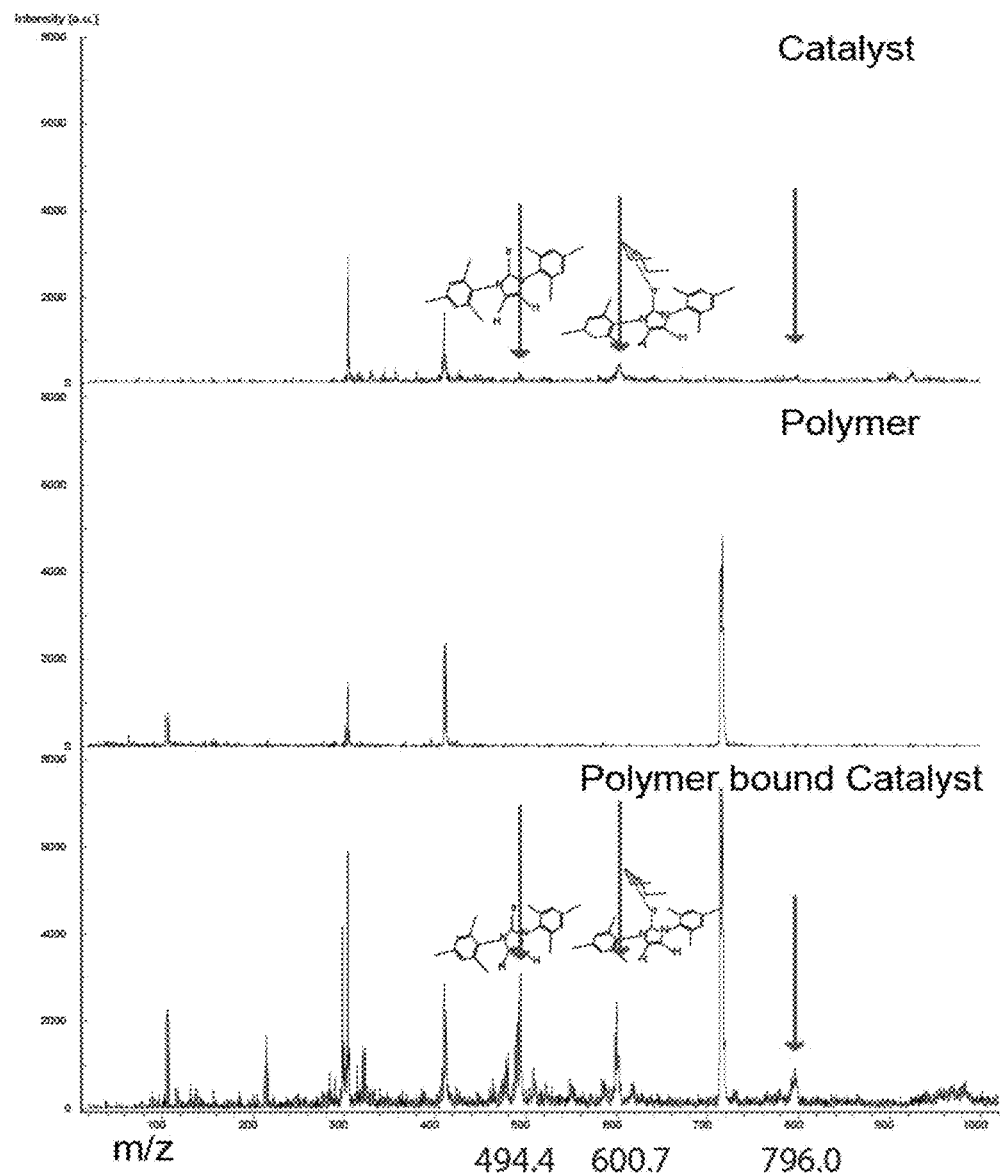
FIG. 2 depicts a mass spectra comparison. The top spectrum is from homogeneous catalyst; the middle spectrum is from a bare polymer support material, and the bottom spectrum is from a completed heterogeneous catalyst. ~10 mg of each sample was ground and tested by LDI-TOF mass spectrometry. Some characteristic peaks shown in the spectrum of homogeneous SABRE catalyst (top) are also shown in the heterogeneous SABRE catalyst (bottom) but are missing from that of the polymer support (middle). Additional peaks (not marked) above 900 units may also be indicative of catalyst presence.

More specific information was provided by mass spectrometry. For each sample (homogeneous catalyst, bare polymer, and the combined HET-SABRE catalyst), particles were attached to a stainless steel sample plate using an adhesive and the plate was loaded into a Bruker Daltonics MicroFlexLR Time-of-Flight mass spectrometer for Laser Desorption Ionization (LDI) mass spectrometry. Each sample was irradiated with a pulsed nitrogen laser (337 nm, 20 kHz repetition rate). The positive ions were observed and recorded to generate mass spectra (e.g. FIG. 2).

Upon comparison of the MS data from the homogenous SABRE catalyst (FIG. 2, top), the bare polymer support (FIG. 2, middle), and the completed heterogeneous SABRE catalyst (FIG. 2, bottom), several characteristic fragments were detected (e.g., those with m/z ratios of 494.4, 600.7, and 796.0). Such peaks, which manifest for both the original homogeneous SABRE catalyst and the supported catalyst (but not the bare polymer), supported that the catalyst was successfully tethered to the polymer particles.

Prior to performing MS, IR spectroscopy was attempted to see if it could be used to confirm the presence of the SABRE catalyst on the polymer particles. A sample from each of the three substances was crushed and suspended in mineral oil and placed between two KBr plates prior to IR acquisition. Spectra (not shown) did appear to exhibit a unique peak at ~3000 cm$^{-1}$ (in the crowded C—H stretch region) that appeared specific to the presence of the SABRE catalyst moiety (i.e., not present in the spectrum of the bare polymer); however, while suggestive, these results were not considered to be definitive.

Atomic absorption spectroscopy (AAS) was also performed. During the synthetic process (after creation of the homogeneous SABRE catalyst, but prior to tethering it to the polymer supports), the Cl atom is stripped from the SABRE catalyst using $AgPF_6$ to result in AgCl precipitate. To validate this process, a small amount of the precipitate in the reaction vial (a few percent) was extracted and placed into a Schlenk tube and washed with THF for three times. The remaining solvent was the removed via vacuum drying, and then ~20 mL Milli-Q water was added to the Schlenk tube. The Schlenk tube was shaken until an even suspension was formed. Finally, the suspension was transferred to an empty vial and used as the AAS sample (Varian, the AAS was calibrated with standard samples of $AgNO_3$). Table 1 shows results from AAS on the precipitate, showing detection of Ag.

TABLE 1

| Trial | Concentration (ppm) |
| --- | --- |
| 1 | 18.26 |
| 2 | 17.92 |
| 3 | 18.58 |
|  | Average |
|  | 18.25 |

The average Ag concentration value was in good agreement with that expected based on calculation, supporting the successful creation of AgCl precipitate, and by extension, the successful stripping of Cl from the Ir atom in the SABRE catalyst (as required for the next step of the synthesis).

The completed HET-SABRE catalyst was also characterized via AAS. Following washing of the completed HET-SABRE catalyst and acid digestion, AAS was used to confirm the presence of Ir metal atoms on the particle surfaces (using an Ir-specific bulb with the AA spectrometer). Three different experiments were performed, with each value reported in Table 2 representing an average of three measurements). Significant (and similar) values of Ir were found in all samples tested, supporting the successful immobilization of the organometallic catalyst moieties on the polymer particles.

TABLE 2

| Trial | Concentration (ppm) |
| --- | --- |
| 1 | 57.33 |
| 2 | 58.89 |
| 3 | 58.64 |

Separately, AAS was also performed on the supernatant liquid of the HET-SABRE catalyst after soaking in a methanol solution containing the substrate (1.25% pyridine by volume) and $pH_2$ (32 psi, ~220 kPa above atmospheric pressure) in order to test to see if exposure to SABRE conditions might result in leaching of the catalyst moiety into the solution (Table 3). Table 3 shows results from AAS on the supernatant taken from a sample containing the HET-SABRE catalyst, before (top) and after (bottom) exposure to $pH_2$ gas (32 psi, ~220 kPa above atmospheric pressure). The asterisk (*) indicates that a small negative value was reported by the instrument, similar to what is reported from testing simple Milli-Q water samples (negative control). Thus, no Ir was observed within the detection limits of the instrument.

TABLE 3

| Trial | Ir Concentration (ppm) |
| --- | --- |
| Before $pH_2$ | 0* |
| After $pH_2$ | 0* |

Similarly, a long-time $^1$H NMR acquisition (1000 scans) also did not show signals that could be assigned to freely floating catalyst molecules. Taken together, these results show that the supported catalyst is stable and does not appear to significantly leach into the solvent under typical experimental conditions.

Two additional SABRE catalysts were synthesized with nanoscale dimensions by tethering variants of Ir-based NHC organometallic catalysts to $TiO_2$/PMAA (polymethacrylic acid) core/shell nanoparticles and PVP (polyvinylpyridine) 'comb' polymers, respectively, in order to investigate the possibility of improved SABRE enhancement.

B. Immobilization of SABRE Catalyst Moieties onto Functionalized $TiO_2$/PMAA Core-shell Nanoparticles

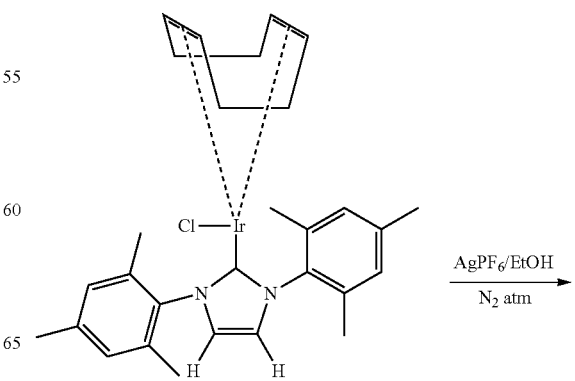

-continued

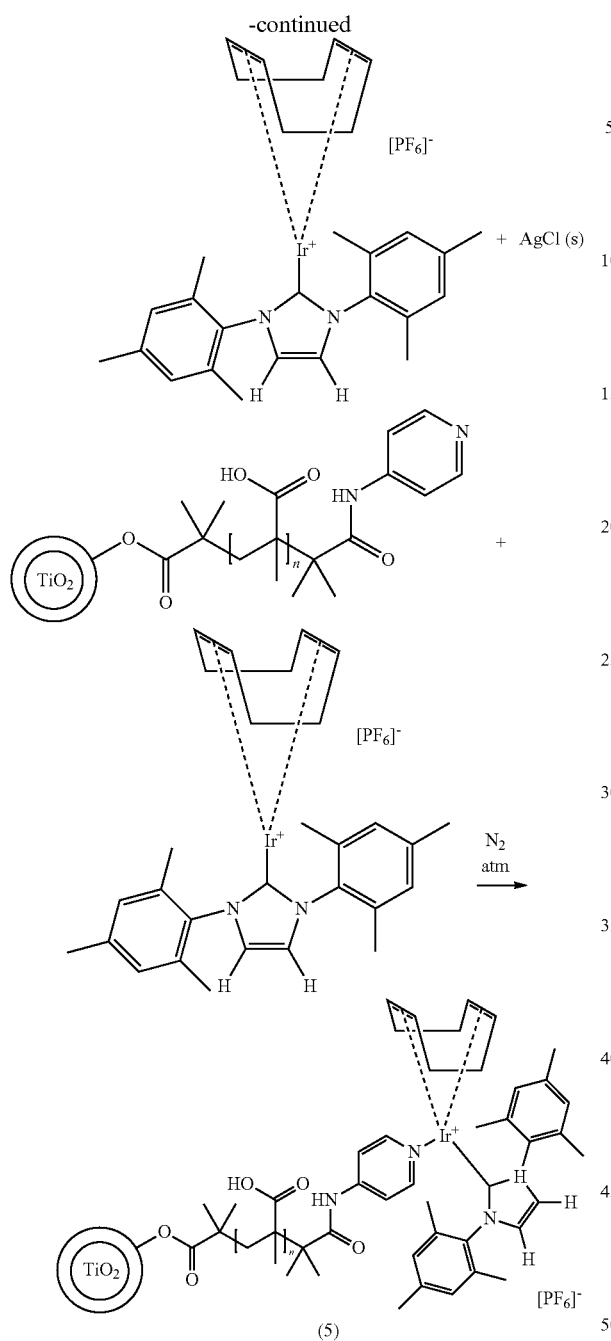

(5)

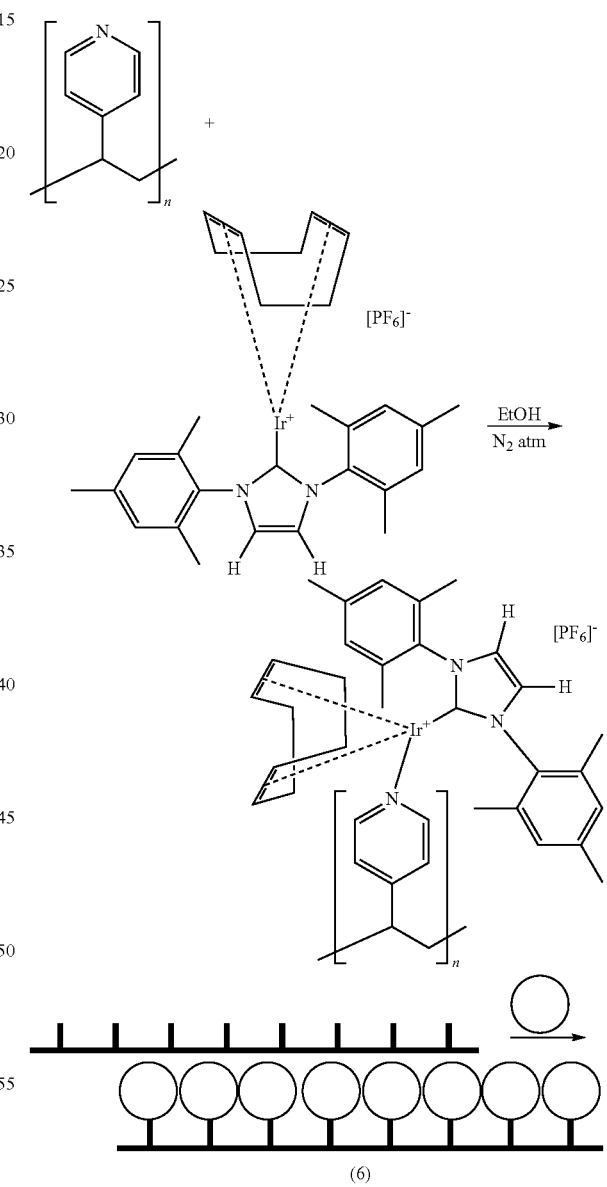

(6)

0.12 g of the IrCl(COD)(IMes) catalyst and 0.051 g of AgPF$_6$ was mixed in 10 mL of degassed dry ethanol within a glove box/N$_2$ atmosphere. After 2 h of dark-condition reaction, the white AgCl precipitate was filtered via syringe filter to give an orange solution. Next, ~0.056 g of the functionalized NPs was suspended in ~15 mL of degassed dry ethanol and placed in a 20 mL vial. ~5 mL of this NP suspension was then mixed with ~1 mL of the previously prepared orange solution containing the modified (primed, Cl— abstracted) SABRE catalyst. This suspension was stirred in the dark for 12 hours within the glove box (inert N$_2$ atmosphere). The resulting suspension was removed from the glove box and placed in an ultrafilter (Millipore, nominal mol. wt. limit: 5000) and centrifuged at 5000 rpm for 10 s of min. The filtrate at the bottom of the tube was removed and tested for the presence of Ir with AAS after the final washing cycle. The NP precipitate and suspension in the top portion of the tube was carefully removed from the filter and transferred to a small round-bottom flask and roto-evaporated; further drying was performed using N$_2$ gas purge. This washing process with dry ethanol was repeated two additional times to provide the final TiO$_2$/PMAA core/shell NP SABRE catalyst (5).

Successful preparation of the desired nanoscale SABRE catalyst was supported by qualitative observation, NMR, AAS, and dynamic light scattering (DLS) experiments.

C. SABRE Catalyst Immobilized onto the Comb Polymer

Within a glove box (N$_2$ atmosphere), 0.0839 g [IrCl(COD)(IMes)] and 0.0635 g of AgPF$_6$ were mixed in 5 mL degassed dry ethanol. After 2 h of dark-condition reaction, the white AgCl precipitate was filtered via syringe filter to give an orange solution. Next, 0.0695 g poly (4-vinylpyridine) comb polymer (Aldrich, PN#472344; average mol. wt. ~60,000) was dissolved in the same solution and stirred in the dark for 15 hours. The solution was then filtered by a syringe filter [Millipore, MWCO 5000 Da]. The comb polymer catalyst solution was then dried in the fume hood for 3 d to yield the final product (6).

Successful preparation of the desired nanoscale SABRE catalyst was supported by qualitative observation, NMR, AAS, and dynamic light scattering (DLS) experiments.

The disclosed synthetic methods may include isolation and purification methods well-known to those skilled in the art of organic synthesis. Examples of conventional methods for isolating and purifying compounds can include, but are not limited to, chromatography on solid supports such as silica gel, alumina, or silica derivatized with alkylsilane groups, by recrystallization at high or low temperature with an optional pretreatment with activated carbon, thin-layer chromatography, distillation at various pressures, sublimation under vacuum, and trituration, as described for instance in "Vogel's Textbook of Practical Organic Chemistry", 5th edition (1989), by Furniss, Hannaford, Smith, and Tatchell, pub. Longman Scientific & Technical, Essex CM20 2JE, England.

Optimum reaction conditions and reaction times for each individual step can vary depending on the particular reactants employed and substituents present in the reactants used. Specific procedures are provided in the Examples section. Reactions can be worked up in the conventional manner, e.g. by eliminating the solvent from the residue and further purified according to methodologies generally known in the art such as, but not limited to, crystallization, distillation, extraction, trituration and chromatography. Unless otherwise described, the starting materials and reagents are either commercially available or can be prepared by one skilled in the art from commercially available materials using methods described in the chemical literature. Starting materials, if not commercially available, can be prepared by procedures selected from standard organic chemical techniques, techniques that are analogous to the synthesis of known, structurally similar compounds, or techniques that are analogous to the above described schemes or the procedures described in the synthetic examples section.

Manipulation of reaction conditions, reagents and sequence of the synthetic route, protection of any chemical functionality that cannot be compatible with the reaction conditions, and deprotection at a suitable point in the reaction sequence of the method are included in the scope of the invention. Protecting groups and the methods for protecting and deprotecting different substituents can be found in PGM Wuts and TW Greene, in Greene's book titled Protective Groups in Organic Synthesis (4$^{th}$ ed.), John Wiley & Sons, NY (2006), which is incorporated herein by reference in its entirety.

It can be appreciated that the synthetic schemes and specific examples as described are illustrative and are not to be read as limiting the scope of the invention as it is defined in the appended claims. All alternatives, modifications, and equivalents of the synthetic methods and specific examples are included within the scope of the claims.

4. Methods Of Using Heterogeneous Catalysts

A. Sabre catalyst Moieties on TiO$_2$ Core-shell Nanoparticles

Figure 3:
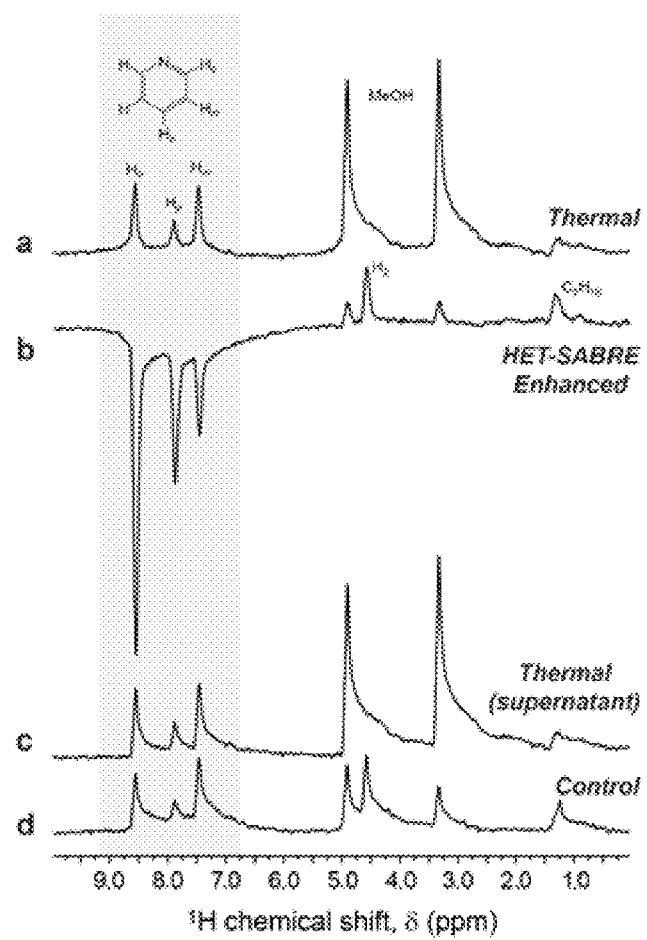
FIG. 3A depicts a proton NMR spectrum from a degassed mixture containing methanol-$d_4$ solvent, the HET-SABRE catalyst particles, and the Py-$h_5$ substrate thermally polarized at 9.4 T.
FIG. 3B depicts a corresponding HET-SABRE spectrum obtained from the sample immediately after administration of $pH_2$ gas, agitation at ~100 G, and rapid transfer to the 9.4 T NMR magnet.
FIG. 3C depicts a thermally polarized proton NMR spectrum from a supernatant solution; the corresponding control experiment using the supernatant solution is shown in (FIG. 3D); no SABRE enhancement is observed. All spectra shown were acquired with a single scan (90° pulse). Peaks at ~3.3 and ~4.9 ppm are from residual protons from the deuterated solvent; the peak at ~4.5 ppm in (FIG. 3B) and (FIG. 3D) is from $H_2$ gas; the peak at ~1.3 is assigned to cyclooctane ($C_8H_{16}$).

Results from SABRE demonstration experiments are provided in FIG. 3. 14 mg of (4), described above, (corresponding to ~0.0015 mmol Ir complex) was added to a custom stopcock-sealed 5 mm Pyrex NMR tube with 200 μL methanol-d$_4$ and 0.03 mmol pyridine-h$_5$ (Py-h$_5$). A typical thermally polarized $^1$H NMR signal obtained after degassing the sample is provided in FIG. 3A. Following addition of ~2400 Torr (~320 kPa) of pH$_2$ gas (pH$_2$ fraction: ~64%) to the sample and a brief period of vigorous shaking in the fringe field of a wide-bore 9.4 T magnet (local field: ~100 G), the NMR tube was immediately inserted into the magnet and a corresponding HET-SABRE-enhanced $^1$H NMR spectrum was obtained (FIG. 3B). Clear and unambiguous HET-SABRE enhancement was observed, as manifested by: (i) the larger signal; and (ii) the emissive peaks for the substrate pyridine resonances in a pattern qualitatively similar to that typically achieved with the homogeneous version of the catalyst (3). Note that during the shaking, the particles are distributed throughout the sample liquid; however, as soon as the shaking is finished, the particles quickly settle out onto the bottom of the NMR tube—effectively separating themselves from the liquid in the coil region. Indeed, the chemical shifts of the substrate pyridine $^1$H resonances in FIGS. 3A and 3B are all for free (unbound) pyridine; bound pyridine resonances are typically also observed in the case of homogeneous SABRE. Quantification of enhancements ($\epsilon$) is impeded by the reduced shim quality (from the sample shaking, heterogeneous sample contents, and reduced liquid level to facilitate mixing), which gives rise to imperfect spectral line shapes. Nevertheless, testing different integration limits allows estimated values of $\epsilon=(-)5.2\pm0.3$, $(-)4.1\pm0.3$, and $(-)2.7\pm0.2$ for ortho, para, and meta $^1$H positions around the pyridine ring to be obtained using: $\epsilon=(S_{enhanced}-S_{thermal})/S_{thermal}$, where S is a given integrated spectral intensity from FIGS. 3A and 3B (in good quantitative agreement with simple peak-height measurements). These results may be compared with corresponding SABRE enhancements obtained with the homogeneous SABRE catalyst (3), with $\epsilon$ values up to ~(−)70-fold being achieved under otherwise comparable conditions, but with a similar pattern of relative enhancements.

Particularly given the larger enhancements observed under homogeneously catalytic conditions, it is important to confirm that the results in FIG. 3B are not simply due to "conventional" (i.e. homogeneous) SABRE involving catalyst molecules that have leached from the solid supports to become dissolved in solution. Following the experiment in FIG. 3B, the supernatant liquid was separated from the HET-SABRE particles (4), and a similar SABRE experiment was performed on that liquid in the absence of (4). FIG. 3C shows a thermally polarized $^1$H spectrum from the supernatant solution, compared to that obtained following the administration of 2400 Torr (~320 kPa) of pH$_2$ (~59% pH$_2$ enrichment), agitation at ~100 G, and insertion into the 9.4 T magnet (FIG. 3D). No SABRE enhancement is observed in FIG. 3D; moreover, AAS, MS, and long-time $^1$H NMR acquisition did not observe the presence of leached catalyst in the supernatant solution (within detection limits). Furthermore, signatures of substrate Py-h$_5$, solvent (methanol-d$_4$), and cyclooctane were present in all four spectra (FIG. 3; H$_2$ (g) is also observed in the SABRE experiments b&d); cyclooctadiene is hydrogenated as a byproduct and removed from the Ir center as part of catalyst activation.

These results demonstrate that the enhancements in FIG. 3B were not due to residual homogeneous catalyst floating freely in solution, but instead are the result of a true heterogeneous SABRE process. Finally, the HET-SABRE experiment in FIG. 3B was repeated using pyridine-d$_5$ as the substrate. No discernable SABRE enhancement of the substrate resonances could be detected (not shown) and no evidence of H/D isotopic exchange was observed under present conditions—consistent with the traditional (non-hydrogen-exchange) explanation of SABRE for the HET-SABRE results in FIG. 3B (the recent observation of D/H exchange between substrate and pH$_2$ during high-field studies of homogeneous SABRE with (3) occurred over longer experimental durations and under conditions of stopped-flow pH$_2$ gas delivery).

In summary, a polymer-supported organometallic iridium catalyst is disclosed and can be used for HET-SABRE by achieving enhancement of $^1$H NMR signals of the substrate pyridine. While the ~5-fold enhancements in the substrate's NMR signals are modest compared to previous results obtained with homogeneous SABRE, it should be pointed out that these foregoing experiments are performed under unfavorable conditions compared to homogeneous SABRE: significantly higher substrate-to-catalyst ratio, ~64% pH$_2$ used, and localized nature of active Ir centers on the surface of solid support. Thus, given that other groups have achieved much larger enhancements than the corresponding homogeneous SABRE enhancements reported above, the present HET-SABRE enhancements should not represent a fundamental limit of the HET-SABRE approach. Indeed, it should be possible to achieve much larger HET-SABRE enhancements in the future by improving the delivery of both pH$_2$ gas and the substrate to the catalyst materials (e.g., under higher pH$_2$ pressure and continuous flow), as well as by optimizing catalyst material design (e.g., to improve the solvent accessibility and surface density of activated catalyst sites) and other experimental conditions (including temperature, concentrations, and magnetic field). Furthermore, the substrate-to-catalyst ratio can be decreased by orders of magnitude, because the catalyst can be recycled and used for polarization of multiple batches of substrate. Finally, the HET-SABRE catalyst can be separated from the solution and recycled, and can avoid the unwanted release of chelates into solution by pre-activating the catalyst particles before use. Thus these results, combined with the ready potential of SABRE to achieve relatively low-cost, rapid, and high-throughput production of hyperpolarized substances, open a door to the straight-forward preparation of chemically pure HP agents for a wide range of biological, in vivo, and ultimately clinical spectroscopic and imaging studies.

Figure 4:
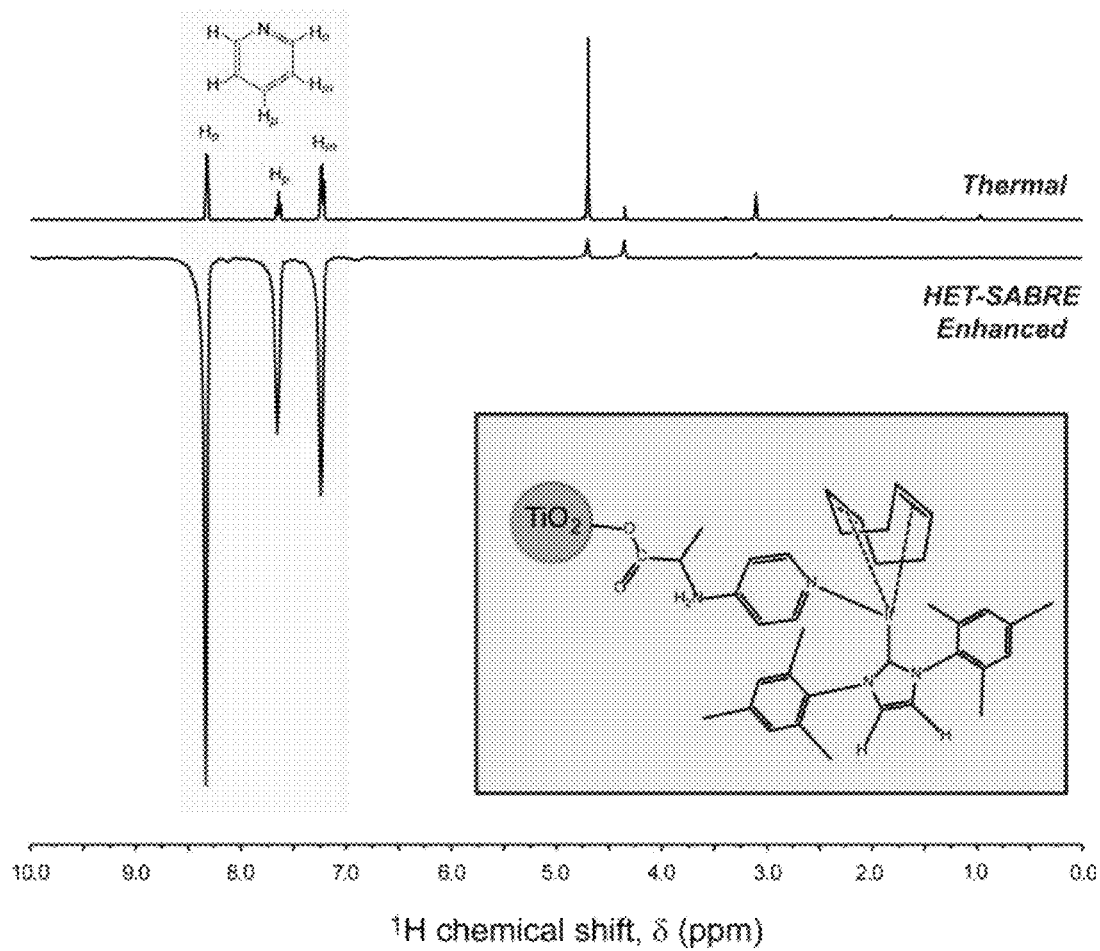
FIG. 4 depicts $^1$H NMR spectrum from a mixture containing d4-methanol solvent, heterogeneous catalyst particles, and a pyridine substrate thermally polarized at 9.4 T. The corresponding heterogeneous catalyst SABRE spectrum after $pH_2$ administration is shown in the bottom spectrum of FIG. 4. The inset shows the chemical structure of the heterogeneous SABRE catalyst tethered covalently to $TiO_2$ nanoparticles.

To that end, a HET-SABRE catalyst on TiO$_2$ nanoparticles was prepared having higher surface area, and observed larger (~15-fold) enhancements (despite relatively poor pH$_2$ fraction, FIG. 4). Improved delivery of pH$_2$, in addition to optimization of the catalyst preparation, can lead to dramatically improved results. Moreover, the catalysts are easy to separate and recycle—opening a door to future potential applications varying from spectroscopic studies of catalysis, to imaging metabolites in the body without concern of contamination from expensive and potentially toxic metal catalysts.

B. SABRE Catalyst Moieties on Functionalized TiO$_2$/PMAA Core-shell Nanoparticles (5)

Figure 5:
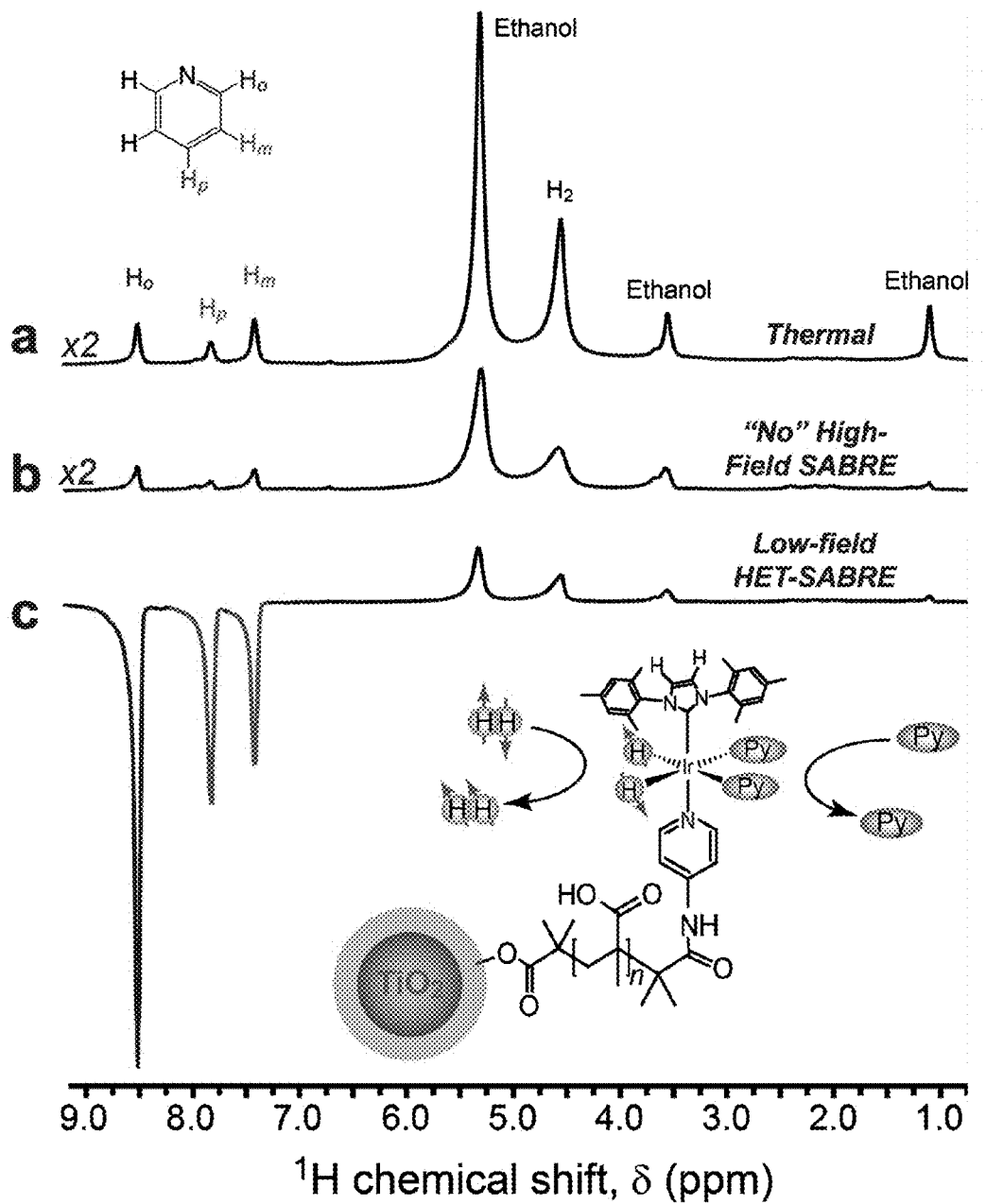
FIG. 5 depicts (a)$^1$H NMR spectrum from a mixture containing $d_6$-ethanol solvent, the nanoSABRE catalyst particles of catalyst (5), and the (fully protonated) pyridine substrate thermally polarized at 9.4 T following activation with $pH_2$ bubbling. (b)$^1$H NMR spectrum of the sample in (a) obtained after nanoSABRE catalyst activation but with $pH_2$ bubbling occurring at high field, acquired immediately after cessation of $pH_2$ gas bubbling; no high-field (in situ) SABRE effect was observed. (c) $^1$H (ex situ) HET-SABRE NMR spectrum obtained from the same sample, acquired immediately after 30 s of $pH_2$ bubbling at low field (~100 G) and rapid transfer of the sample into the NMR magnet. All spectra shown were acquired with a single scan (90° pulse). Peaks at about $\delta \approx 1.1$, $\approx 3.6$, and $\approx 5.2$ ppm are from residual protons from the deuterated ethanol solvent. The peak at $\approx 4.5$ ppm is from (ortho-)hydrogen ($oH_2$) gas. The inset shows the expected hexacoordinate structure of the activated catalytic moiety, exchanging with $pH_2$ and the substrate (Py).

Following activation, the capability of catalyst (5) to provide SABRE enhancement was investigated. Results are shown in FIG. 5.

A number of thermally polarized $^1$H NMR spectra were acquired over the course of the experiment, including one following catalyst activation at high field (FIG. 5a). Ex situ bubbling of pH$_2$ (~95% fraction) for 30 s followed by rapid manual transfer of the sample into the magnet gave rise to significant enhancements of the substrate $^1$H NMR signals (FIG. 5c), with ε values of ~(-)18, ~(-)17, and ~(-)7 estimated for ortho, para, and meta positions, respectively. Subsequent acquisition following 300 s of ex situ pH$_2$ bubbling yielded larger enhancements of ~(-)26, ~(-)39, and ~(-)11 compared to a thermally polarized scan taken afterwards (bubbling does lead to some loss of liquid from the sample, necessitating a fresh thermal scan). Reduced shim quality made precise quantification of the enhancements challenging, but the values reported are again in good agreement with estimates based on simple peak-height analyses performed on peaks with similar linewidths. Moreover, with a pH$_2$ bubbler that is limited in operation to near-ambient pressure, typical enhancements obtained with homogeneous catalysts rarely exceed ~50-100-fold (also reflecting non-optimal conditions with respect to concentrations, temperature, magnetic field, etc.). Thus, it is likely that significantly larger HET-SABRE enhancements can be achieved in the future not only by improving the experimental methodology, but also through further optimization of the catalyst syntheses and structures.

Figure 6:
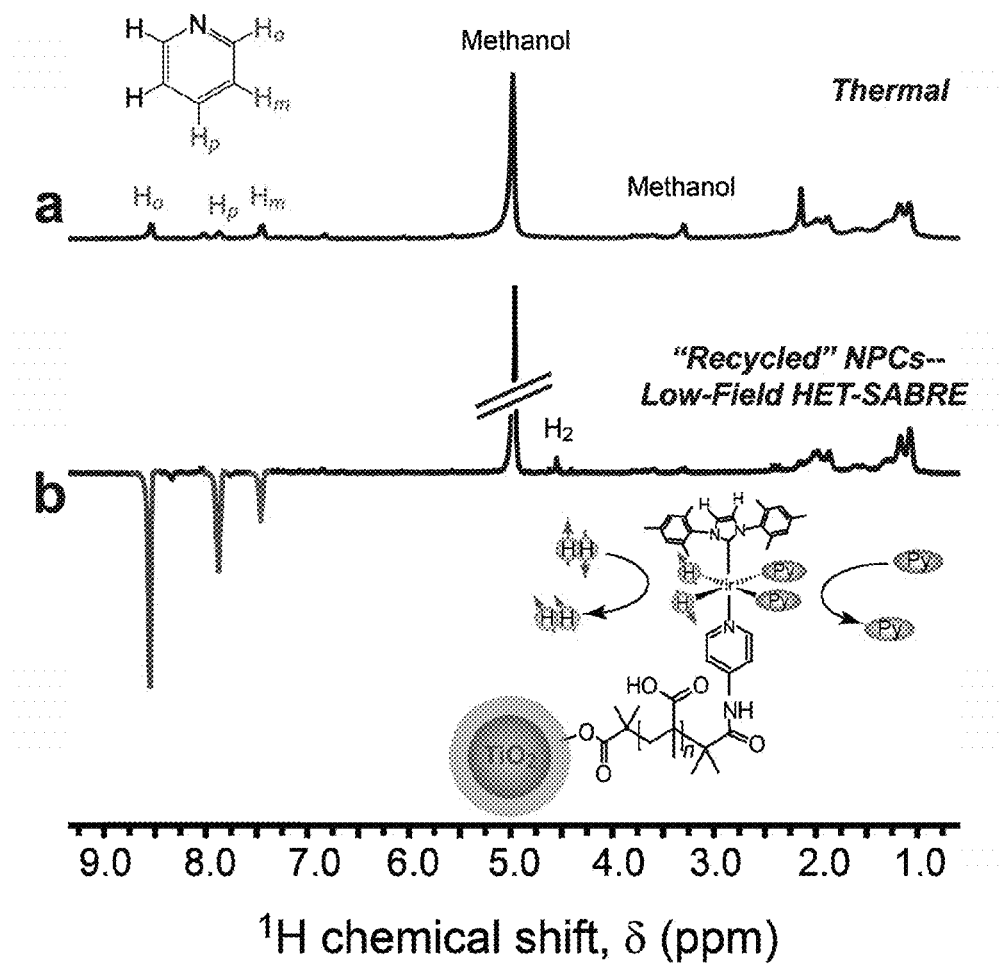
FIG. 6 depicts (a)$^1$H NMR spectrum from a mixture containing $d_4$-methanol solvent, "recycled" NPCs [catalyst (5)], and the pyridine substrate thermally polarized at 9.4 T. (b) Corresponding $^1$H (ex situ) HET-SABRE NMR spectrum obtained from the same sample of "recycled" NPCs, acquired immediately after 30 s of $pH_2$ bubbling at low field (~100 G) and rapid transfer of the sample into the NMR magnet. All spectra shown were acquired with a single scan (90° pulse). Peaks at about $\delta \approx 3.3$ $\approx 4.9$ ppm are from residual protons from the deuterated methanol solvent. The peak at $\approx 4.5$ ppm is from $oH_2$; broad peaks ~1-2 ppm are primarily from the PMAA of the catalyst particles.

The above experiment afforded an opportunity to investigate the potential of recovery and recycling/re-use of such supported SABRE catalysts. For example, following the above SABRE experiment and ultrafilter centrifugation, a portion of the catalyst (5) NPCs were carefully recovered from the ultrafilter cartridge, dried, and re-suspended in 0.4 mL of an alternative solvent (again, d$_4$-methanol) with ~0.05 mmol of added pyridine substrate. Following low-field bubbling with pH$_2$ (~85% pH$_2$ fraction) for 30 s and rapid transfer to high field, HET-SABRE enhancements of the substrate $^1$H NMR signals are clearly observed from the recycled and reconstituted NPCs (FIG. 6). Although these enhancements (up to ~(-)11-fold) are smaller than what was achieved in the first experiments with these catalysts—likely because of reduced catalyst concentration and slightly reduced pH$_2$ fraction (in addition to any loss of catalytic activity suffered during the recovery/reconstitution process)—these results demonstrate the feasibility of recovering and recycling supported SABRE catalysts for re-use in NMR applications.

C. SABRE Catalyst on the Comb Polymer (6)

Figure 7:
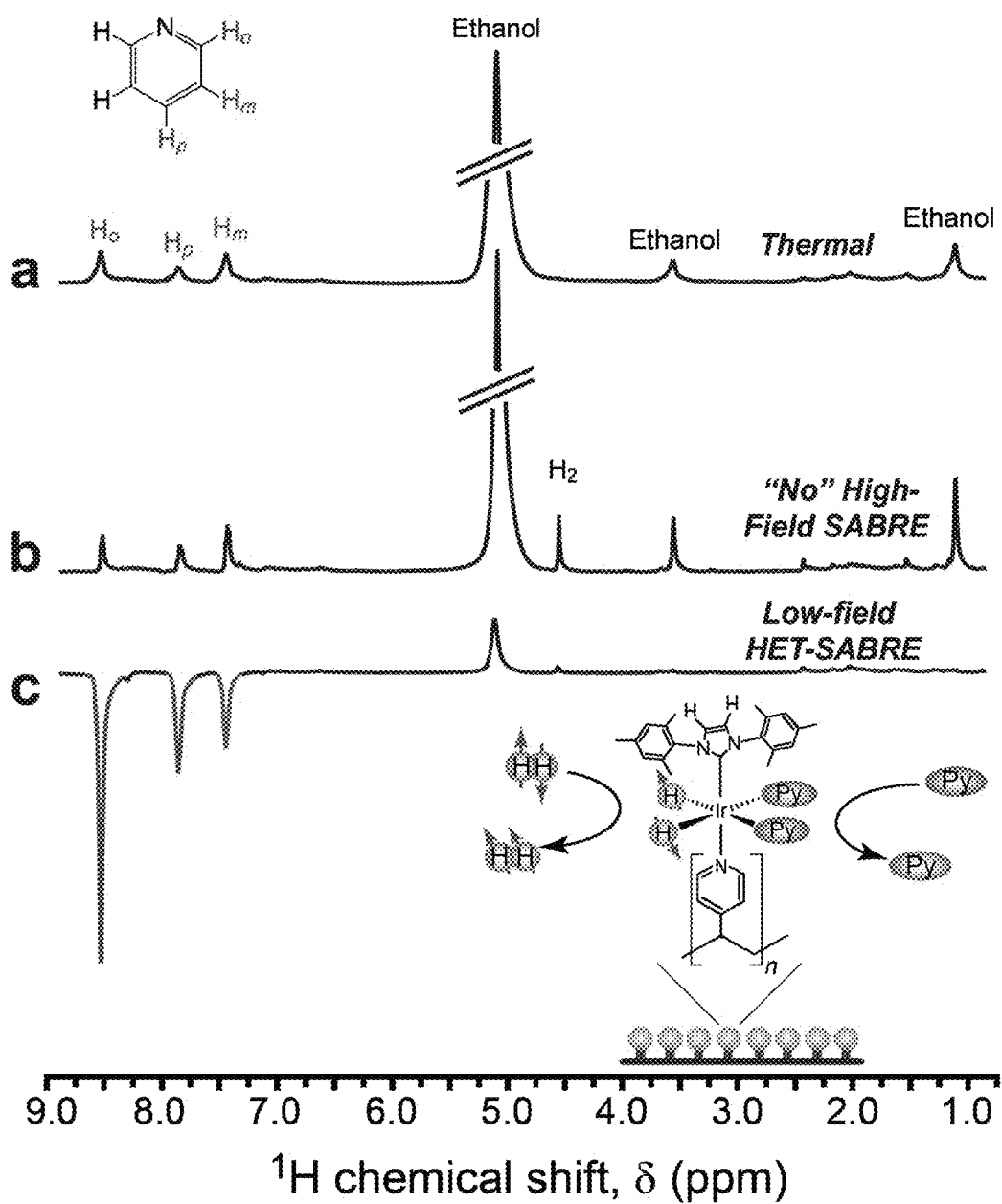
FIG. 7 depicts (a)$^1$H NMR spectrum from a mixture containing $d_6$-ethanol solvent, the PVP polymer comb catalyst particles (6), and the (fully protonated) pyridine substrate thermally polarized at 9.4 T following activation with $pH_2$ bubbling. (b)$^1$H NMR spectrum of the sample in (a) obtained after PVPC activation but with $pH_2$ bubbling occurring at high field, acquired immediately after cessation of $pH_2$ gas bubbling; for the most part, no high-field (in situ) SABRE effect was observed. (c)$^1$H (ex situ) HET-SABRE NMR spectrum obtained from the same sample, acquired immediately after 30 s of $pH_2$ bubbling at low field (~100 G) and rapid transfer of the sample into the NMR magnet. All spectra shown were acquired with a single scan (90° pulse). Peaks at about $\delta \approx 1.1$, $\approx 3.6$, and $\approx 5.2$ ppm are from residual protons from the deuterated ethanol solvent. The peak at $\approx 4.5$ ppm is from (ortho-)hydrogen ($oH_2$) gas. The inset shows the expected hexacoordinate structure of the activated catalytic moiety, exchanging with $pH_2$ and the substrate pyridine (Py).

Following activation, the capability of catalyst (6) to provide SABRE enhancement was investigated. Results are shown in FIG. 7.

A typical thermally polarized $^1$H NMR spectrum from the sample (here, prior to acquisition) is provided in FIG. 7a. A spectrum obtained after activation and 30 s of pH$_2$ bubbling (~93% pH$_2$ fraction) at high field (in situ) is shown in FIG. 7b. Unlike the case with most homogeneous SABRE catalysts we have investigated (see below), virtually no high-field SABRE enhancement is observed in the spectrum—with the possible exception of a miniscule emissive peak that may originate from bound pyridine (ortho-H position, ~8.0 ppm). However when the sample was removed to allow for 30 s of pH$_2$ bubbling within the weak fringe field (~100 G) and then rapidly re-inserted into the NMR magnet, a HET-SABRE-enhanced $^1$H NMR spectrum was acquired (FIG. 7c). Indeed, the HET-SABRE spectrum is clearly manifested by both the stronger signal and the emissive peaks for the pyridine substrate, whose appearance follows the pattern typically obtained with homogenous SABRE. Although quantification of the resulting SABRE effects is impeded by relatively poor shim quality (owing to the effects of sample bubbling, rapid sample transfer, etc.), estimated values for the signal enhancement, $\epsilon=(S_{enhanced}-S_{thermal})/S_{thermal}$ (where S is a given integrated spectral intensity), for ortho, para, and meta $^1$H positions around the pyridine ring were ~(-)7, ~(-)6, and ~(-)3, respectively—in good agreement with simple peak-height measurements.

It is understood that the foregoing detailed description and accompanying examples are merely illustrative and are not

What is claimed is:

1. A heterogeneous catalyst of formula (I),

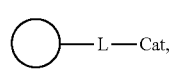   (I)

wherein,

is a solid support;
L is a bond or a linker; and
Cat has formula:

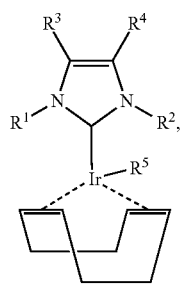   (II)

wherein $R^1$ and $R^2$ are each independently selected from aryl, heteroaryl, arylalkyl, heteroarylalkyl, wherein said aryl, heteroaryl, arylalkyl, and heteroarylalkyl are each independently unsubstituted or substituted with one or more suitable substituents; $R^3$ and $R^4$ are each independently selected from hydrogen and alkyl; $R^5$ is halogen or pyridinyl, wherein said pyridinyl is unsubstituted or substituted with one or more suitable substituents; provided that one $R^1$, $R^2$, $R^3$, $R^4$, and $R^5$ links to the solid support via L;
wherein each suitable substituent is independently selected from the group consisting of perfluoroalkyl, perfluoroalkoxy, alkyl, alkenyl, alkynyl, hydroxy, halo, oxo, mercapto, alkylthio, alkoxy, nitro, azidealkyl, aryl, heteroaryl, aryloxy, heteroaryloxy', aralkyl, heteroaralkyl, aralkoxy, heteroaralkoxy, HO—(C=O)—, heterocylic, cycloalkyl, amino, alkylamino, dialkylamino, carbamoyl, alkylcarbonyl, alkylcarbonyloxy, alkoxycarbonyl, alkylaminocarbonyl, dialkylamino carbonyl, arylcarbonyl, aryloxycarbonyl, alkylsulfonyl, and arylsulfonyl.

2. The catalyst of claim 1, wherein formula (II) has formula:

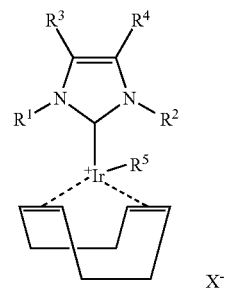

where $X^-$ is a non-coordinating anion.

3. The catalyst of claim 1, wherein formula (II) has formula:

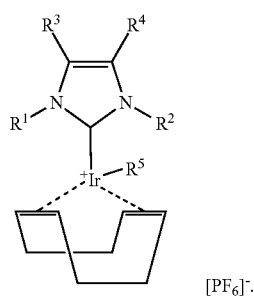

4. The catalyst of claim 1, wherein the solid support is selected from a nanoparticle, a titanium dioxide nanoparticle, silica, a polymer microbead, and a polystyrene microbead.

5. The catalyst of claim 1, wherein L is a bond.

6. The catalyst of claim 1, wherein L is a linker, wherein the linker is derived from an amino acid or 4-dimethyl-amino-pyridine.

7. The catalyst of claim 1, wherein $R^1$ is mesityl.

8. The catalyst of claim 1, wherein $R^2$ is mesityl.

9. The catalyst of claim 1, wherein $R^3$ and $R^4$ are each hydrogen.

10. The catalyst of claim 1, wherein $R^5$ is chloro.

11. The catalyst of claim 1, wherein $R^5$ is an unsubstituted or substituted pyridinyl.

12. The catalyst of claim 1, having formula (I-a),

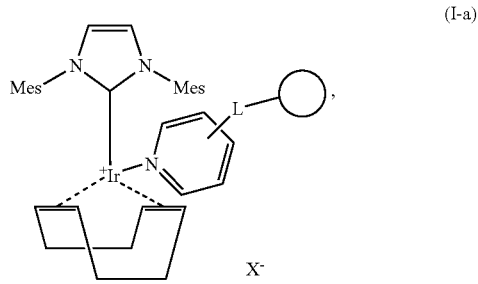   (I-a)

wherein Mes is mesityl; and $X^-$ is a non-coordinating anion.

13. The catalyst of claim 1, having formula (I-b),

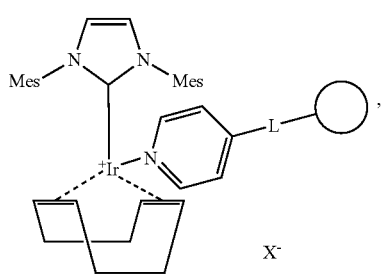

(I-b)

wherein Mes is mesityl; and X⁻ is a non-coordinating anion.

14. The catalyst of claim 1, having formula (I-c),

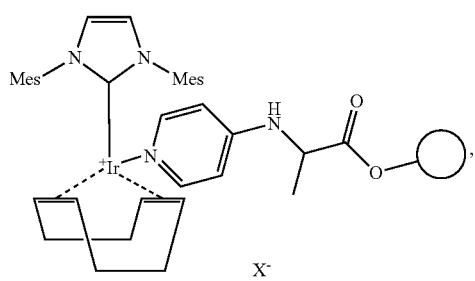

(I-c)

wherein Mes is mesityl; and X⁻ is a non-coordinating anion.

15. The catalyst of claim 14, wherein the solid support is a TiO$_2$ nanoparticle.

16. The catalyst of claim 1, having formula (I-d),

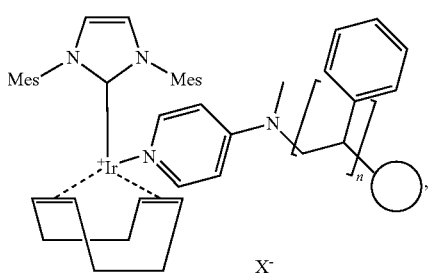

(I-d)

wherein Mes is mesityl; X⁻ is a non-coordinating anion; and the solid support is polystyrene.

17. The catalyst of claim 1, having formula (I-e),

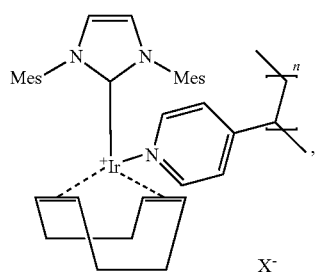

(I-e)

wherein Mes is mesityl; and X⁻ is a non-coordinating anion.

18. The catalyst of claim 1, having formula (I-f),

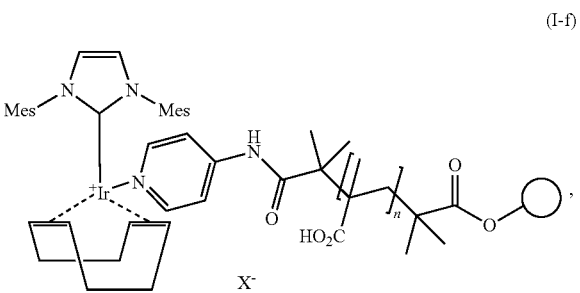

(I-f)

wherein Mes is mesityl; X⁻ is a non-coordinating anion; and the solid support is a TiO$_2$ nanoparticle.

* * * * *